No. 675,707.　　　　　　　　　　　　　　　Patented June 4, 1901.
E. BESSE & L. LUBIN.
PRESERVE TIN.
(Application filed Dec. 14, 1900.)

(No Model.)

WITNESSES:
M. A. Bloudel
Jos. A. Ryan

INVENTORS
Emile Besse.
Louis Lubin.
BY Munn & Co.
ATTORNEYS

UNITED STATES PATENT OFFICE.

EMILE BESSE AND LOUIS LUBIN, OF PARIS, FRANCE.

PRESERVE-TIN.

SPECIFICATION forming part of Letters Patent No. 675,707, dated June 4, 1901.

Application filed December 14, 1900. Serial No. 39,864. (No model.)

*To all whom it may concern:*

Be it known that we, EMILE BESSE and LOUIS LUBIN, citizens of the Republic of France, and residents of the city of Paris, France, have invented a certain new and useful Improvement in the Construction of Preserve-Tins, of which the following is a full, clear, and exact description.

This invention relates to the construction of soldered preserve-tins and analogous vessels, and has for its object to enable the soldering of such tins to be effected with the aid of a soldering-iron or other like tool with or without pressure and in such a manner as to prevent the melted solder (which is interposed between the tin and its cover or bottom plate) from running during the soldering into the interior or down the outside of the tin.

In order that our invention may be readily understood and carried into effect, we will now proceed to describe the same more fully with reference to the accompanying sheet of drawings, in which—

Figure 1:
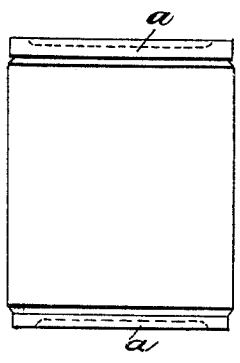
Figure 2:
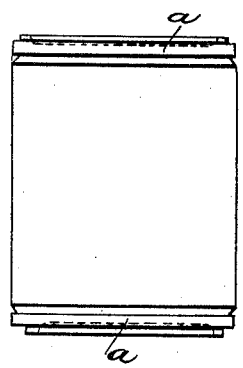
Figure 3:
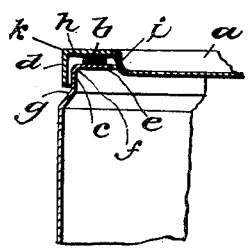
Figure 4:
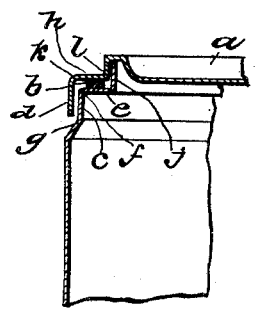

Figures 1 and 2 are external views of two preserve-tins embodying this invention, and Figs. 3 and 4 are sectional views drawn to a larger scale and showing the mode of assembling the edges of the tin with its cover or bottom plate.

Between the top plate $a$ and the upper edge of the tin box there is placed a ring of solder $b$. After the plate $a$ has been placed upon the tin a soldering-iron or other convenient tool appropriately heated is applied to the said plate, so as to cause the solder $b$ to fuse. To prevent this solder from running either into the interior or down the exterior of the tin, the edges of the sides and of the cover and bottom plates are formed as hereinafter described. The solder having cooled, a solid assemblage between the body of the tin and its bottom or cover is insured.

In the form of vessel shown in Figs. 1 and 3 the edge of the tin is formed with a contracted vertical portion $c$ and a horizontal portion $e$, forming a right angle to the former, while the edge of the bottom or cover plate is formed with a vertical portion or flange $d$, a horizontal portion $h$, and a short vertical portion $i$, projecting toward the interior of the tin. The solder $b$ is placed between the two portions $e$ and $h$. As the vertical flange $d$ of the cover or bottom is made to fit and to form a tight joint with the contracted portion $c$ or rests upon the shoulder $g$, it will be obvious that the melted solder is prevented from escaping to the exterior or running down the sides of the tin, while at the same time it is retained from escaping into the interior by the portion $i$ of the cover-plate which fits against the inner edge of the horizontal portion $e$ of the tin.

In order to provide a sufficient space for the expansion of the soldering metal during fusing, it is advantageous to make the angle $f$, formed by the parts $e$ and $c$ of the box, slightly rounded, so as to leave a space between the said angle $f$ and the angle $k$ of the soldering-plate.

The form shown in Figs. 2 and 4 differs from that previously described in so far as there is provided at the internal edge of the horizontal portion of the box and its covering-plate an additional or complementary flange $j$ and $l$, disposed vertically. These flanges $j$ and $l$, projecting toward the exterior, fit snugly on one another in the manner indicated at Fig. 4, and thus provide greater security against the escape of the solder into the tin. In this form of execution the part $i$ of the edge of the tin or the cover-plate forming a projection toward the interior may have a form less concave or even plane.

We claim—

1. A metal box or vessel for containing preserves, comprising a body having its end contracted to form a neck, from the upper end of which extends inwardly a horizontal member, and a cover having an annular recess on its under face and provided with a marginal flange fitting on the neck of the body, the inner horizontal member of the body and the recess in the cover being constructed and so arranged with respect to each other as to prevent the solder placed between the said horizontal member of the body and cover from passing between the said member and one wall of the recess into the said body, as set forth.

2. A metal box or vessel for containing preserves, comprising a box or vessel having its end contracted to form a neck, from the upper edge of which extends inwardly a horizontal member having at its inner end an outwardly-extending member, and a cover having near its margin an annular raised portion from the lower edge of the outer wall of which extends a horizontal member having at its outer end an inwardly-extending member fitting upon the neck of the body, a ring of solder being adapted to be placed between the horizontal members of the body and cover, as set forth.

In testimony whereof we have hereunto signed our names in presence of two subscribing witnesses.

EMILE BESSE.
LOUIS LUBIN.

Witnesses:
GEORGES DELORN,
EDWARD P. MACLEAN.